May 29, 1945.  W. H. GREEN  2,376,912
FILTER BED EXPANSION CONTROL
Filed Aug. 30, 1941
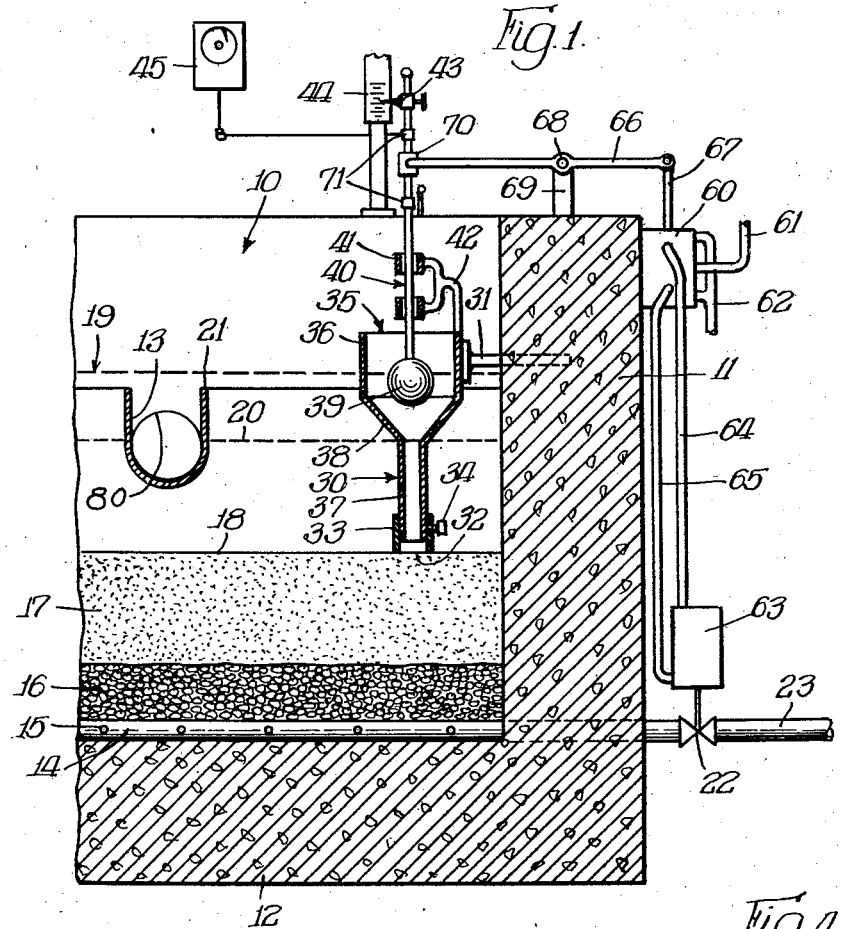
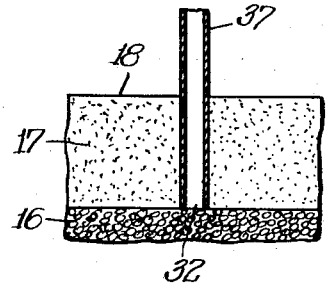
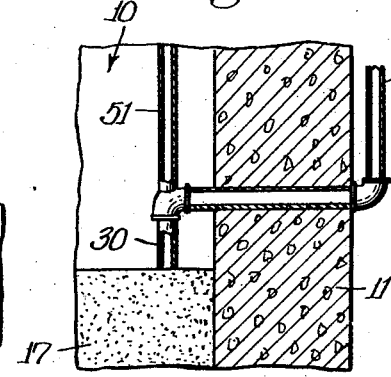
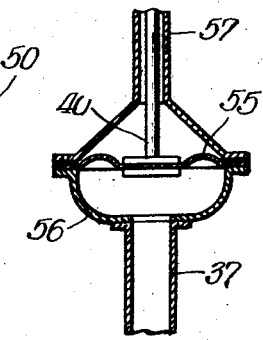
INVENTOR
Walter H. Green,
BY Robyn Hilcox
atty.

Patented May 29, 1945

2,376,912

UNITED STATES PATENT OFFICE 2,376,912

FILTER BED EXPANSION CONTROL

Walter H. Green, Chicago, Ill., assignor to Infilco Incorporated, a corporation of Delaware Application August 30, 1941, Serial No. 408,963

12 Claims. (Cl. 210—130)

This invention relates to filters for the purification of water, sewage and the like and particularly to apparatus and method for measuring and controlling certain functions of the so-called filter backwash.

A primary object of my invention is to provide improved method and apparatus for measurement and control of filter backwash.

Another object is to provide an improved method and apparatus for measuring and controlling filter bed expansion during backwashing or cleansing thereof, wherein the difference between the specific weights of water and of the expanded sand bead is relied on and utilized for controlling or indicating the sand expansion.

Another object is to provide a method and apparatus wherein a filter backwash flow, or certain functions thereof, are controlled in proportion with the depth and specific weight of the expanded bed.

Another object is to provide method and apparatus for such control of filter bed expansion, applying the U-tube principle in a simple and efficient control device.

Still another object is to provide apparatus for measuring and controlling the rate of flow through a filter during its cleansing, or backwashing, wherein a float or other testing means, not in contact with any impure liquid, filter sand or the like, actuates the controlling or indicating member.

Still other objects will appear from the specification and claims which follow.

It has been usual in the past to measure and control the filter backwash flow in order to eliminate unnecessary power expense for pumping backwash water, to control the loss of filter sand, to avoid objectionable disturbance of the filter bed, and yet to provide the necessary agitation and expansion of the filter bed. Such measurement and control usually have been indirect by mechanical means rather than direct because the washing process itself cannot be observed by the filter operator, his sight being obstructed by the turbidity of the backwash water which rises from the sand bed to the top of the filter chamber. The mechanical measurement or control of the backwash flow may be either a measurement and control of the rate of flow of backwash water through a conduit, or it may be a measurement and control of the amount of expansion of the sand bead. The bed expansion, of course, is partly controlled by the rate of flow, but it also depends on the specific gravity and size of the filter sand grains, the temperature and viscosity of the water, and possibly some other factors. Consequently, control from the rate of flow alone is not sufficient for careful and accurate backwashing.

My invention contemplates control and indication of the filter bed expansion itself. I prefer this principle over that of controlling and indicating the rate of backwash flow because I can have satisfactory agitation within a considerable range of flow rates, but the limits of allowable expansion within the bed, for efficient performance, are necessarily limited in any particular filter installation.

It has heretofore been proposed to measure the expansion of the filter bed and to effect control thereof by a float riding on or rising with the expanded bed. In such methods the float is submerged in the dirty water so that accretions may occur over its whole area and deposits adhere on its upper surfaces. Even a slight variation in the weight of the float is material because the buoyancy of the float is due only to the slight difference in the specific gravity between water and the lightly expanded top surface sand. The method preferred herein is an advance over such a method, and particularly so in that I protect my float from the accretion and deposit that occurs when the float is on or in the dirty water. My improved method and apparatus contemplates not merely the protection of the float from deposit, but also an arrangement wherein the float rides on a column of water and so uses the full specific gravity of the water. I go further than this and measure, so to speak, the full effect or weight of the expanded sand bed and not merely the buoyancy of a thin upper layer thereof. I am therefore able to avoid deposit of matter on the float and to more accurately measure the amount of expansion of the bed.

Sand filters of municipal water plants are a typical example of filters as contemplated herein and the invention will be illustrated and described as applied to such a filter, although it is not so limited.

The several features and advantages of my invention will be clearly understood on consideration of the following description in connection with the drawing appended, in which like reference characters refer to like elements in the figures.

Figure 1 is a partial diagrammatic side view, in cross section, of a filter embodying my invention.

Figure 2 is a partial diagrammatic elevation of a modified embodiment of my invention.

Figure 3 is a partial diagrammatic elevation of another modified embodiment of my invention.

Figure 4 is a partial diagrammatic elevation of still another modified embodiment of my invention.

My invention may be utilized in a filter 10 of conventional design, including side walls 11, a floor 12, wash troughs 13, an underdrain 14, provided with a plurality of orifices 15, a gravel bed 16, and a sand bed 17. During the filtering, or normal downward, flow of water through the filter bed, the sand will have an upper surface at some definite level, such as 18. The operation of such a filter bed is well known and need not be described in detail. Water to be filtered is initially distributed over the bed by wash troughs 13 which communicate with influent opening 80 passes through the sand bed 17 and the gravel bed 16 and is collected in the underdrain 14 from which it is withdrawn through a pipe 23. After a time the sand becomes clogged by the accumulation of solids removed from the water and may be somewhat compacted. It, therefore, becomes necessary to loosen the sand bed and to clean it. Both of these purposes are accomplished by passing water backwardly through the pipe 23, upwardly through the gravel bed 16, the sand bed 17, and the water so used, containing the foreign matter washed from the bed, is withdrawn to waste through the wash troughs 13, and a wash water outlet, which also may be the inlet 80, the direction of flow through the inlet-outlet 80 and the wash troughs 13 being controlled by suitable valves, not shown. The flow during such a backwashing period is considerably greater than the flow during filtering, as it must be great enough to loosen the compacted bed and wash away foreign matter, but must not be large enough to wash away the sand. To prevent this washing away of the sand the level of the expanded sand bed must be below the weir edge 21 of the wash troughs 13, but desirably not too far below, since the dirt has to be raised over the weir 21 into the trough; and each increase in distance that the dirt must be raised increases the amount of water required. Since, as noticed above, the backwash water over the bed will be very turbid, it is impossible for an operator to see the top of the expanded bed, hence the utility of an indicator.

Ordinarily during operation the surface of the water will be considerably above the top 18 of the sand bed 17 as at level 19. During backwashing of the filter, the sand bed expands and the top may reach an elevation, such as 20, considerably above the top 18 of the bed during normal downflow at which time the bed will be compacted. The weir edges 21 of the wash troughs 13 should be above the upper limit 20 of the expanded sand bed. During backwashing the water flowing upwardly through the bed will have its surface at a level even with the weir edges 21, as the wash water escapes through the wash troughs 13 to waste. In order to secure proper washing and to avoid waste of water and damage to the sand bed 17 during backwashing, it is necessary to control the flow of wash water through the bed, which may be accomplished by a backwash control valve 22 interposed in the conduit 23 leading to the underdrain 14.

In order to control the rate of flow during backwashing, I provide an open ended pipe or float tube 30 vertically supported in the filter 10 as by a bracket 31 secured to the filter wall 11. The lower end 32 of this pipe is preferably positioned adjacent the elevation of the surface 18 of the sand bed 17 when the latter is compacted after filtration, but it can be positioned at some point below that surface as shown in Figure 2, or it could be above the surface 18. Since the volume of the bed may vary, due to loss of sand in successive washing operations or accretion on the sand grains of scale and the like, I prefer to provide an adjustable sleeve 33 held in a predetermined position by any suitable means, such as a set screw 34, so that the position of the lower end of the pipe 30 can be adjusted relative to the level 18 of the compacted sand bed 17. The upper end 35 of the pipe 30 must be above the water level 21 established during the backwash and may be above the water level 19 maintained during filtration. The upper end 35 of the pipe 30 is preferably of greater diameter than the lower part thereof, forming an enlarged portion or float chamber 36 which is joined to a lower and narrower part 37 by inclined walls 38, thereby preventing the retention of particles of dirt or sand or the like which may occasionally find their way into the tube.

A float 39 is movably positioned within a float chamber 36. The float rests upon and its position indicates the water surface in the stand-pipe 30 during the backwash. The float carries a vertical rod 40 which is slidably held and guided, as by sleeves 41 secured to brackets 42 attached to any suitable support, such as the float chamber 36. The upper end of the float rod 40 carries a pointer 43 cooperating with a fixed scale 44 supported in any suitable manner. The pointer and scale serve to conveniently indicate the vertical elevation of the float. Suitable recording means 45 may be added to provide a permanent record of the sand expansion obtained.

The float chamber 36 and the upper part of the filter 10 above the sand bed 17 are in effect two legs of a U-tube which communicate directly with one another through the lower end 32 of the pipe 37. In accordance with well-known physical laws, a U-tube when suitably used will serve to measure the specific weight or the depth of a liquid or semi-liquid medium in one leg of the tube. I propose to utilize this principle for the purposes hereinabove stated in a manner that will be understood from what follows. During the filtering operation and prior to the start of the backwash flow, the water will stand at the same elevation in the float tube or chamber 30, and over the filter bed outside the tube, since both are filled with water and the two are in communication. Theoretically, there might be some difference in level due to difference of turbidity of the water in the two spaces, but actually this is too small to be material.

It is well known that the backwash which flows upwardly from the under-drain 14 through the gravel 16 and sand bed 17 causes the sand bed to expand. It expands outside, but not inside, the float tube 30. This is due to the general flow rising around and below the float tube 30, such flow being prevented from entering in and passing through the pipe as the upper end 35 thereof is above the level established by the weir 21 of the wash troughs 13. Therefore, the motive force for sand bed expansion can operate only outside the pipe. This submerges the lower end of the standpipe in suspended sand on the outside thereof, or in other words, fills one leg of the U-tube formed by the filter 10 and the float tube 30 with a mixture of water and sand, the other leg remaining filled with clear water. Since sand is heavier than water, the clear water in the second leg will rise in response to the pressure from the expansion of the sand bed in the first leg or, more particularly, in response to a product of weight and depth of the expanded bed above the level 32 of the bottom of the pipe. Thus, the pointer 43 of the float rod 40 will indicate the depth of expansion of the sand bed 17 once that scale has been properly calibrated. In order to so calibrate the scale, I may either ascertain the specific gravity and screen analysis of the particular filter sand used, calculate the specific gravity of the various mixtures to be considered and mark the gradations accordingly; or I may ascertain and mark the rise of the float pursuant to certain actual expansions of the bed brought about during a test run. I have followed both methods with success.

A part 50 of the float tube 30 can be located outside the filter as suggested by Figure 3, for instance in order to facilitate transmission of the float movements to a control table in the filter operating gallery. In this embodiment, a vent 51 may be provided inside the filter 10 so that air that enters the sand bed 17 and float tube 30 may be released outside the float chamber 36 rather than through the same.

The liquid head in the tube 30 may be made to control a diaphragm 55 rather than a float, as suggested in Figure 4, as the diaphragm is the equivalent of the float shown in Figure 1. In such an embodiment I prefer that the diaphragm 55 be placed in a suitable chamber 56 provided with an upwardly extending wall 57 rising to above the liquid level in the filter during both downflow and upflow. This is desirable as water which might be permitted to flow into the upper part of the diaphragm chamber 56 would tend to deposit solids, thereby altering the reading of the pointer. In the form of this embodiment, the upward pressure on the diaphragm will be a function of the expansion of the sand during backwash the same as when a float is used.

Obviously, it is very desirable to provide automatic control of the backwash flow. I contemplate adding control means adapted to be governed from the float or diaphragm rod 40 and to govern the backwash control valve 22. Such means may take the form of a pilot valve 60. The construction of such pilot valves is well known and need not be described. It is therefore shown diagrammatically. It may be operated by hydraulic or air pressure, entering through a pressure pipe 61, and flowing to waste through a waste pipe 62. The pressure from the pressure pipe 61 is utilized to operate a piston, not shown, in a pressure cylinder 63 by means of leads, such as 64 and 65, communicating respectively with the top and bottom of the pressure cylinder 63 and the pilot valve 60. The movement of a piston, not shown, in the pilot valve 60 permits the flow of pressure fluid from the pipe 61 through one of the leads, while the other is open to waste, so that pressure fluid operates the valve 22 by movement of a piston in the pilot valve 60. The operation of such pilot valves is well known and need not be further described. The piston in the pilot valve 60 is operated by a rod 66 pivotally connected to a tail rod 67 of the piston and to the float rod 40 and fulcrumed, as at 68, by any suitable means, such as a riser 69. Such leverage and parts auxiliary thereto may take various forms and are only shown diagrammatically, a number of mechanical means for the same being known in the art. The rod need not be directly pivoted to the float rod 40, but may be attached to a slidable collar 70 around the float rod 40. In that event the float rod is provided with fixed collars 71 so that as the float 39 approaches the predetermined level corresponding to the sand expansion to be maintained during backwashing, the lower collar 71 on the float rod 40 will engage the slidable collar 70 of the float rod 40, whereby the pilot lever 66 is pivoted to depress the tail rod 67 and the piston, not shown, in the pilot 60 to close the valve 22. Conversely when the float 39 drops below a predetermined level, the upper collar 71 will engage collar 70, and thus lower the left-hand side of the lever 66, thereby operating the pilot 60 in the opposite direction. Thus the pilot 60 comes into play when the desired level is reached.

Should the float 39 rise above the predetermined level, indicating that the sand level has risen somewhat above the desired maximum level 20, then the lever 66 causes the piston of the pilot valve 60 to connect the pressure conduit 61 with the top lead 64 to move the backwash control valve 22 towards closed position, the other lead 65 then being connected to the waste conduit 62. The closing movement of the control valve 22 continues until the backwash rate has dropped enough to cause the sand bed to settle back to the normally expanded position 20, returning the float 39 to the level which causes the lever 66 to bring the pilot valve 60 to intermediate position. This locks the backwash control valve 22 in that position. Similarly, a drop of the expanded sand level is automatically corrected by readjustment of the backwash control valve 22 to a somewhat more open position, through reverse operation of the float, pilot valve, and auxiliary parts.

At some times the backwash rate may be of the order of perhaps 20 to 30 gallons per minute per square foot of filter area; and at other times it may merely be 10 to 20 gallons depending upon existing conditions. In any case, the flow will be controlled to give the desired expansion of the bed.

As will be understood by those acquainted with the art, various other modifications can be applied to the method and apparatus described.

I claim:

1. In combination with a filter of the type comprising a filter compartment, an underdrain in the lower part of said compartment, a granular filter bed overlying said underdrain, an inlet for water to be filtered to said compartment and an outlet for backwash water from said compartment above said filter bed, and means including said underdrain for delivering an upward flow of liquid through said bed, an improved means for measuring the upward flow of liquid through said filter bed comprising an open ended tube having a vertically disposed portion, the lower end of said tube being adjacent the normal upper level of the filter bed during normal downflow and the upper end being above the level of the liquid outlet for the filter during such upward flow, a float within said tube, and means associated with said float for indicating the height of liquid within said tube.

2. In combination with a filter of the type described that has a granular filter bed, an inlet into the lower portion of said bed and an outlet from above said bed, a means for measuring the expansion of said bed during upflow of water therethrough comprising a substantially vertical open ended tube, the lower end of which is not higher than about the upper level of the unexpanded filter bed and the upper end of which is above the level of said outlet, and means for indicating static head within said tube, said means including a member within said tube responsive to changes of liquid static head therein and an indicator operatively joined to said responsive member.

3. An apparatus adapted to be placed in the upper part of a filter having a granular filter bed for measuring the expansion of the bed during upward flow of water therethrough, comprising a tube open at both ends and of sufficient length, when mounted in a filter chamber that contains a filter bed, to reach from adjacent the level of the top of the unexpanded bed to above the level of the water over the bed during upflow therethrough, a float in said tube, and indicating means operatively joined to said float.

4. In combination with a filter of the type described that has a granular filter bed, an inlet into the lower portion of said bed and an outlet from above said bed, a means for measuring the expansion of said bed during upflow of water therethrough comprising a vertically extending open ended tube, the lower end of which is not higher than about the upper level of the unexpanded filter bed and the upper end of which is above the level of said outlet, means for indicating liquid head within said tube, said means including a member within said tube responsive to changes of liquid head therein and an indicator operatively joined to said responsive member, a flow controller operatively connected to said inlet to control the flow of liquid therethrough, an actuator for positioning said flow controller, and a link connecting said member to said actuator whereby the actuator may be operated by changes of position of said member.

5. In a filter of the type described having a granular filter bed, an improved device for measuring the expansion of the bed during upward backwash flow therethrough, said device comprising a float, an indicating member joined to said float to be moved thereby, and means to shield said float from the backwash water comprising a chamber enclosing said float and extending vertically from above the surface of the wash water over the bed down to at least about the surface of the unexpanded filter bed, said chamber being open to the atmosphere above the surface of the wash water and open to the bed at its lower end.

6. In combination with a filter of the type described having a granular filter bed and means for providing an upward flow of liquid through said bed including an inlet conduit opening into the bottom of said bed and an outlet above said bed, an improved means for the control of expansion of the bed during upward flow of liquid therethrough comprising a float, means to shield said float from the upward flow of water comprising a chamber open at its top and bottom enclosing said float and extending downwardly from above the level of said outlet, to at least about the level of the unexpanded filter bed, valve means in said inlet conduit adapted to control the rate of flow of liquid therethrough, and means operable by said float to position said valve.

7. In combination with a filter of the type described, having a granular filter bed therein, said bed being expanded by upward liquid flow therethrough during backwashing, an inlet for liquid to be filtered above said bed, an underdrain below said bed, a filtered liquid outlet leading from said underdrain, a backwash inlet discharging into said underdrain and a backwash outlet from above said bed, an improved device for metering and indicating the degree of expansion of said bed during said backwash, comprising a float adapted to float on said liquid, a pointer operatively joined to said float, an index cooperating with said pointer, and a float chamber surrounding said float, the top of said float chamber being open and at an elevation above the surface of the liquid over the filter bed when the latter is in its most expanded condition, and the bottom of said chamber being open to said bed at a level not higher than about the level of the unexpanded filter bed.

8. The apparatus of claim 7 comprising also a pilot valve operatively connected to said float to be positioned according to the position of the float and a valve means on said backwash inlet operatively connected to said pilot valve.

9. A method of controlling the expansion of a granular filter bed during upflow of liquid therethrough which comprises confining a body of the liquid in a vertically extending enclosure, the top of which is open to the atmosphere and is above the surface of the liquid rising through said bed during such upflow and which is also open to the expanded bed at a predetermined lower level therein, measuring the difference in surface levels within and without said enclosure, and controlling the amount of said upflow from such difference in surface levels.

10. The apparatus of claim 2 comprising also a valve on said inlet, a pilot means controlling the positioning of said valve, and a link connecting said responsive member to said pilot means.

11. The apparatus of claim 2 wherein said responsive member comprises a float.

12. The apparatus of claim 2 wherein said responsive member comprises a diaphragm extending across said tube.

WALTER H. GREEN.

CERTIFICATE OF CORRECTION.

Patent No. 2,376,912.   WALTER H. GREEN.   May 29, 1945.

It is hereby certified that error appears in the printed specification of the above numbered patent requiring correction as follows: Page 1, first column, lines 14 and 52, for the word "bead" read --bed--; page 2, first column, line 73, for "filiter" read --filter--; and that the said Letters Patent should be read with this correction therein that the same may conform to the record of the case in the Patent Office.

Signed and sealed this 11th day of September, A. D. 1945.

(Seal)

Leslie Frazer
First Assistant Commissioner of Patents.